United States Patent
Richardson et al.

(10) Patent No.: US 9,772,888 B2
(45) Date of Patent: Sep. 26, 2017

(54) SEMAPHORE WITH TIMEOUT AND LOCK-FREE FAST PATH FOR MESSAGE PASSING ARCHITECTURES

(71) Applicant: Wind River Systems, Inc., Alameda, CA (US)

(72) Inventors: Raymond Richardson, Richmond, CA (US); Gregory Stults, Berkeley, CA (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 264 days.

(21) Appl. No.: 13/859,852

(22) Filed: Apr. 10, 2013

(65) Prior Publication Data

US 2014/0310438 A1 Oct. 16, 2014

(51) Int. Cl.
*G06F 12/00* (2006.01)
*G06F 12/14* (2006.01)
*G06F 17/00* (2006.01)
*G06F 7/00* (2006.01)
*G06F 9/52* (2006.01)

(52) U.S. Cl.
CPC .................. *G06F 9/526* (2013.01)

(58) Field of Classification Search
CPC ...... G06F 9/526; G06F 9/52; G06F 17/30371; G06F 17/30362
USPC .......................................... 710/200; 707/704
See application file for complete search history.

(56) References Cited

U.S. PATENT DOCUMENTS

| | | | | |
|---|---|---|---|---|
| 5,095,421 A * | 3/1992 | Freund | ............... | G06F 11/1474 707/E17.007 |
| 5,341,491 A * | 8/1994 | Ramanujan | ................... | 711/152 |
| 5,682,537 A * | 10/1997 | Davies | .................... | G06F 9/524 707/999.008 |
| 6,076,130 A * | 6/2000 | Sharma | ........................ | 710/310 |
| 6,341,285 B1 * | 1/2002 | Blott | ................ | G06F 17/30353 |
| 6,480,918 B1 * | 11/2002 | McKenney et al. | .......... | 710/200 |
| 6,493,804 B1 * | 12/2002 | Soltis | .................. | G06F 12/0815 707/999.009 |
| 6,810,470 B1 * | 10/2004 | Wiseman | ............ | G06F 13/1631 711/156 |
| 2003/0060898 A1 * | 3/2003 | Jenkins et al. | .................... | 700/2 |
| 2003/0145146 A1 * | 7/2003 | Posner | .................... | G06F 9/526 710/200 |
| 2004/0003188 A1 * | 1/2004 | Rao | ................ | 711/154 |
| 2006/0048149 A1 * | 3/2006 | Clift | ....................... | G06F 9/526 718/100 |
| 2006/0143416 A1 * | 6/2006 | Kamigata | ............... | G06F 9/526 711/163 |
| 2007/0044103 A1 * | 2/2007 | Rosenbluth et al. | ......... | 718/104 |
| 2007/0124728 A1 * | 5/2007 | Rosenbluth et al. | ......... | 718/100 |

(Continued)

*Primary Examiner* — Faisal M Zaman
(74) *Attorney, Agent, or Firm* — Fay, Kaplun & Marcin, LLP (57) ABSTRACT

The exemplary embodiments describe systems and methods for utilizing a semaphore with timeout and lock-free path for message passing architectures. One embodiment is related to a method comprising receiving a request from a client to access an object, the object including a plurality of resources, placing the request in a lock-free pend queue of a semaphore, manipulating a count of the semaphore based on an availability of at least one of the plurality of resources, and determining whether the client can use a fast path to the object.

20 Claims, 6 Drawing Sheets

(56) References Cited

U.S. PATENT DOCUMENTS

| | | | |
|---|---|---|---|
| 2007/0157200 A1* | 7/2007 | Hopkins | G06F 9/52 718/100 |
| 2009/0083497 A1* | 3/2009 | Yu | G06F 12/0842 711/144 |
| 2010/0250809 A1* | 9/2010 | Ramesh et al. | 710/200 |
| 2011/0131193 A1* | 6/2011 | Pasupuleti et al. | 707/704 |
| 2011/0153992 A1* | 6/2011 | Srinivas | G06F 9/45516 712/220 |
| 2011/0276690 A1* | 11/2011 | Whitehouse | 709/226 |
| 2012/0102501 A1* | 4/2012 | Waddington | G06F 9/5061 718/105 |
| 2013/0031069 A1* | 1/2013 | Dudgeon | G06F 17/30171 707/704 |

\* cited by examiner

SEMAPHORE WITH TIMEOUT AND LOCK-FREE FAST PATH FOR MESSAGE PASSING ARCHITECTURES

BACKGROUND

In a multitasking environment there is often a requirement to synchronize the execution of various tasks or ensure one process has been completed before another begins. This requirement is facilitated by the use of a software switch known as a semaphore. Specifically, an operating system may implement at least one semaphore to determine an order in which processes are to be executed. The semaphore may be a variable or abstract data type which controls access to a common resource that is used by multiple applications in a parallel programming environment.

A counting semaphore may utilize a counter system for a set of available resources. For example, the counting semaphore may include a count representing a maximum number of resources for processes of the operating system. For each process using a resource, the count may be decremented until no further processes may be allocated a resource. Upon a resource becoming free, the count may be incremented so that the counting semaphore may allocate the freed resource to an application.

Conventional semaphores for an operating system may utilize a lock or non-deterministic atomic operators to isolate the semaphore for a process. However, the locks may result in deadlocks or other impasses that prevent the semaphore from being acquired. For instance, one application may lock a semaphore and then go into an endless loop or otherwise encounter an error. A timeout is enforced when an entity that does not own the semaphore is unable to acquire within a specified amount of time. This may occur under normal conditions, that is, the another entity (or series of entities) may acquire the semaphore and hold it longer than the caller wishes to wait for it to become available. Alternatively, complex lock-free algorithms may be difficult to prove correct which may result in misallocation of resources, bypassing of processes queued for allocation of a resource, etc.

Within these conventional computer systems, there is no known implementation of semaphore timeout for semaphores with lock-free fast paths and message passing backends.

SUMMARY

The exemplary embodiments describe systems and methods for utilizing a semaphore with timeout and lock-free path for message passing architectures. One embodiment is related to a method comprising receiving a request from a client to access an object, the object including a plurality of resources, placing the request in a lock-free pend queue of a semaphore, manipulating a count of the semaphore based on an availability of at least one of the plurality of resources, and determining whether the client can use a fast path to the object.

A further embodiment is related to a system, comprising an object including a plurality of resources, a semaphore including a lock-free pend queue and a decision variable, and an iso-locator core receiving a request from a client to access the object, placing the request in the lock-free pend queue of the semaphore, manipulating the decision variable of the semaphore based on an availability of at least one of the plurality of resources, and determining whether the client can use a fast path to the object.

A further embodiment is related to a computer readable storage medium including a set of instructions executable by a processor, the set of instructions operable to receive a request from a client to access an object, the object including a plurality of resources, place the request in a lock-free pend queue of a semaphore, manipulate a count of the semaphore based on an availability of at least one of the plurality of resources, and determine whether the client can use a fast path to the object.

DETAILED DESCRIPTION

The exemplary embodiments may be further understood with reference to the following description and the appended drawings, wherein like elements are referred to with the same reference numerals. The exemplary embodiments describe an operating system utilizing a semaphore with timeout and lock-free path for message passing architectures. In other words, the path of the semaphore may be completely lock-free, not using locks or non-deterministic atomic operators. The semaphore schedules tasks to be executed by resources of the operating system using deterministic atomic operators for acquisition and/or release of the semaphore count. It may be noted that use of non-deterministic atomic operators may be unavoidable on architectures that do not support deterministic atomic-operators. Fundamentally this design is suitable for both types of atomic operators and may be employed on processors that only support non-deterministic atomic operators.

Accordingly, exemplary embodiments described herein may implement essential semaphore functionality (e.g., timeout) that is both high performance and scalable to massively multi-core environments. For instance, one exemplary embodiment of the semaphore may be virtual board environment ("VBE") semaphores used by a multi-core inter-process communication hypervisor ("MIPC HV"). The semaphore, the count, the scheduling, the acquisition, the release, and a related method will be discussed in further detail below.

Figure 1:
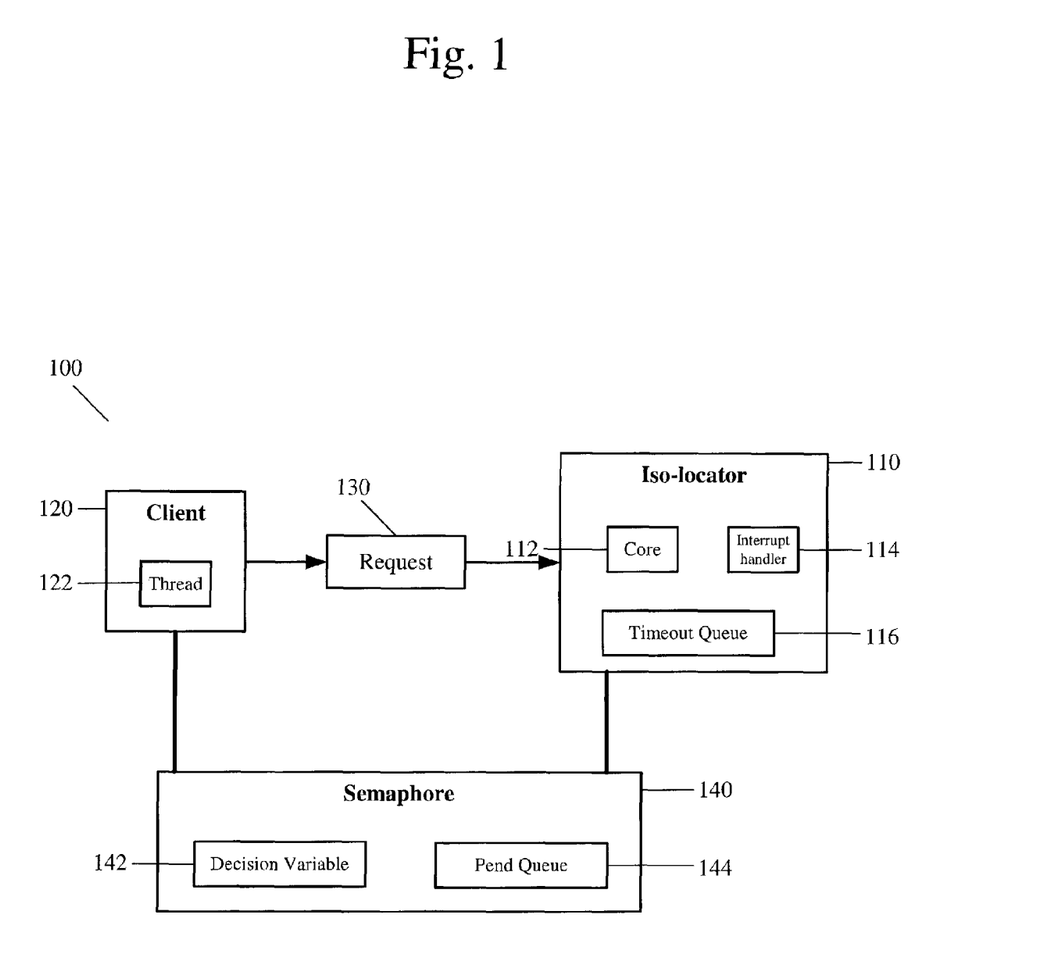
FIG. 1 shows an exemplary system utilizing a semaphore with timeout and lock-free path for message passing architectures according to an exemplary embodiment.

FIG. 1 shows an exemplary system 100 utilizing a semaphore with timeout and lock-free path for message passing architectures according to an exemplary embodiment. The system 100 includes an iso-locator 110, a client 120 (e.g., a request sender) having a client thread 122 (e.g., process), a request 130 including the thread ID and a protected data structure, such as a semaphore 140.

According to the exemplary system 100 the iso-locator 110 may perform sequenced iso-location. Iso-location may be described as a methodology for implementing lock-free objects, which uses the notion of a single chain of execution accessing the object atomically. Requests to access the object may be queued in a sequence to this chain by the iso-locator 110.

According to one embodiment, sequenced iso-location may utilize a simple operation to determine whether or not a request from the iso-location should be made. For instance, this simple operation may be an atomic operation on a variable, similar to a futex operation. One skilled in the art would understand that a futex is a fast userspace mutual exclusion ("mutex") construct that may be implemented as a basic locking mechanism or serve as a building block for higher-level locking abstractions such as semaphores.

A request 130 at the iso-locator 110 may be made through a lock-free queue. For instance, the process may use a single, fixed-size buffer such as a single-reader/single-writer ring buffers for buffering requests. In addition, the transition of the queue from empty to non-empty may use signaling and/or polling for deterministic systems. Furthermore, when a request 130 is made, the process may not have to wait on the results of the request. A decision operation may fully inform the process of the results of the request.

It may be noted that while an exemplary embodiment may be implemented on a synchronous messaging system, addition embodiments are not limited such schemes. For instance, further embodiments may use a decision variable to convey such results from the iso-locator 110 to the client 120.

According to the exemplary embodiments, the iso-locator 110 may process each request 130 atomically with respect to the protected data structure of the semaphore 140. Protection may be achieved by limiting access of the data structure to the iso-locator 110. Within a kernel application of sequenced iso-location, an exemplary iso-locator 110 may include a core 112 and an interrupt handler 114. Accordingly, sequencing from the iso-locator core 112 may lock interrupts and run. In addition, iso-location may be implemented as threads.

The exemplary semaphore 140 may be identified with an integral identifier that may be used to identify a semaphore index to the iso-locator 110. Furthermore, the semaphore 140 includes a decision operand (e.g., "decision variable" 142) and internal structures (e.g., "pend queue" 144). It should be noted that these components of the semaphore 140 are merely exemplary and do not necessarily have to exist in an intersecting, space. Accordingly, sequenced isolation implementations may be made wherein the iso-locator 110 and the client 120 share no memory.

The decision variable 142 may be globally visible, while the pend queue 144 may be only visible to the iso-locator 110. More specifically, the decision variable 142 may be described as an atomically modifiable variable visible in memory to all entities that make use of the semaphore 140. By atomically manipulating the decision variable 142, an entity performing a semaphore P or V operation may be able to determine whether a "fast path" (e.g., an operation that requires no locking or messaging) can be used. Furthermore, the decision variable may include a resource count and an in-flight release count, as well as a "key" to the pend queue 144. The functionality of the decision variable 142 will be described in greater detail below. It may be noted that access to the decision variable 142 by the iso-locator 110 is not necessary, nor is it precluded.

The pend queue 144 may be described as a data structure capable of maintaining a specified ordering scheme on those entities blocked on the semaphore 140. The pend queue 144 may only be visible to the iso-locator 110 of the semaphore 140. It should be noted that the term "pend" and variations thereof may generally relate to the more conventional term "block" and variations thereof when referring to operating systems. Thus, the term "pend" may be used interchangeably with the term "block."

Each of the iso-locators may maintain the queuing data structure. Mutually exclusive access to the queuing structure may be achieved by restricting operation on a specific semaphore, such as semaphore 140, to a single iso-locator, such as iso-locator 110. In order to manage timeouts, the iso-locator 110 may also include a component to maintain a "release count," as well as a component to track elapsed time.

According to the exemplary embodiments, sequenced iso-location may be used to implement P (wait) and V (signal) operations of the semaphore 140. As noted above, the decision variable may be a count, wherein positive values indicate free resources and the absolute value of a negative number is the number of waiting clients. The P( ) operation decrements the decision variable count and the V( ) operation increments the decision variable count. More specifically, the wait operation decrements the value of semaphore variable by 1. If the value becomes negative, the process executing wait( ) is blocked and added to the pend queue 144 of the semaphore 140. The signal operation increments the value of semaphore variable by 1. After the increment, if the pre-increment value was negative (e.g., there are processes waiting for a resource), a blocked process is transferred from the pend queue 144 to a ready queue. Accordingly, simple limited count implementations may be used to implement binary semaphores. It may be noted that alternatives, such as but not limited to mutexes may be implemented with sequenced iso-location.

The decision of the semaphore from the P( ) operation is whether or not to pend the requesting process. If the result of decrementing is a negative value, the semaphore 140 may send a "pend" message to the iso-locator 110 and pend the process. If the result of the increment is zero or greater, the process may continue.

It may be noted that while the pseudocode presented below may be for an implementation on a system that employs a synchronous messaging scheme. That is, a 'send' operation may block the caller until the receiving thread performs a 'reply' operation. However, as discussed above, further embodiments may be implemented on a system employing an asynchronous messaging scheme.

An example of a P( ) operation may be described using the following pseudocode. For example, the following pseudocode may illustrate a set of instructions that may be executed for a program that performs a wait( ) function:

```
int sem_p
(
    semaphore * p_sem,
    unsigned int timeout
)
{
``` again:

```
count = p_sem->count;
avail    = LOCK_AVAIL_GET (count);
in_flight = LOCK_IN_FLIGHT_GET (count);
LOCK_AVAIL_SET (new_count, (avail - 1));
LOCK_IN_FLIGHT_SET (new count, in_flight);
if (cas (&p_sem->count, count, new_count) != OK)
    {
```

```
    goto again;
  }
  if ( (avail <= 0) || (in_flight > 0))
  {
    if (send (iso_locator, &reply, P_OPERATION) == ERROR)
    {
      return (ERROR);
    }
``` post_send_again:

```
    count = p_sem->count;
    avail    = LOCK_AVAIL_GET (count);
    in_flight = LOCK_IN_FLIGHT_GET (count);
    if (reply == timeout)
      {
      LOCK_AVAIL_SET (new_count, (avail + 1));
      LOCK_IN_FLIGHT_SET (new_count, in_flight);
      if (cas (&p_sem->count, count, new_count) != OK)
        {
        goto post_send_again;
        }
      return (ERROR);
      }
    else
      {
      LOCK_AVAIL_SET (new_count, avail);
      LOCK_IN_FLIGHT_SET (new_count, (in_flight − 1));
      if (cas (&p_sem->count, count, new_count) != OK)
        {
        goto post_send_again;
        }
      return (OK);
      }
  }
  return (OK);
}
```

The decision of the semaphore from the V( ) operation is whether or not to release a pending process from the pend queue 144. If the result of incrementing is less than or equal to zero, the semaphore 140 may send a "release" message to the iso-locator 110 and continue the process. If the result of the increment is positive, the semaphore 140 may simply continue.

An example of the V( ) operation may be described using the following pseudocode. For example, the following pseudocode may illustrate a set of instructions that may be executed for a program that performs a signal( ) function:

```
int sem_v
(
  semaphore * p_sem
)
{
  long count;
  long new_count;
``` again:

```
  count = p_sem->count;
  avail    = LOCK_AVAIL_GET (count);
  in_flight = LOCK_IN_FLIGHT_GET (count);
  if (avail < 0)
    {
    LOCK_AVAIL_SET (new_count, (avail + 1));
    LOCK_IN_FLIGHT_SET (new count, (in_flight + 1));
    if (cas (&p_sem->count, count, new_count) != OK)
      {
      goto again;
```

```
      }
    if (send (iso_locator, &reply, V_OPERATION) == ERROR)
      {
      return (ERROR);
      }
    }
  else
    {
    LOCK_AVAIL_SET (new_count, (avail + 1));
    LOCK_IN_FLIGHT_SET (new_count, (in_flight));
    if (cas (&p_sem->count, count, new_count) != OK)
      {
      goto again;
      }
    }
  return(OK);
}
```

At the semaphore 140, messages may be received in any order. Accordingly, a "release" may occur before the "pend." If there is a process in the pend queue 144, it may simply be released as any release may be valid. If there is no process in the pend queue 144, the "release count" may be incremented, which represents the number of threads to release immediately whenever a "pend" message is sent. When a pend message is sent, the release count may be decremented immediately. Therefore, the "release count" may resolve all ordering issues.

The Iso-locator 110 may resume any thread using the thread ID of the pend message sender. It should be noted that any race conditions may be resolved, such as by using simple short spins.

An example of the iso-location operation may be described using the following pseudocode. For example, the following pseudocode may illustrate a set of instructions that may be executed for a program that processes timeouts at the iso-locator 110:

```
void iso_locator
(
)
{
  wait = FOREVER;
  while (1)
    {
    if (recv (&msg, wait) == OK)
      {
      semaphore * p_sem;
      p_sem = SEM_PTR_GET (msg);
      switch (SEM_OP_GET (msg))
        {
        case SEM_P:
          if (SEM_UNPEND_COUNT_GET (p_sem) > 0)
            {
            SEM_UNPEND_COUNT_DEC (p_sem);
            reply (sender, OK);
            }
          else
            {
            }
          pend (sender, p_sem);
          addToTimeoutQueue (sender, timeout);
          wait = TIMEOUT_PERIOD;
          break;
        case SEM_V:
          reply (sender);
          if (SEM_QUEUE_EMPTY (p_sem))
            {
            LOCK_UNPEND_COUNT_INC (p_sem);
            }
          else
            {
```

-continued

```
            owner = unpend (p_sem);
            removeFromTimeoutQueue (owner);
            if (timeoutQueueEmpty( ))
            {
                wait = FOREVER;
            }
            reply (owner, OK);
            }
          break;
        default:
          break;
        }
    }
    /* remove all timed out nodes from queues, reply */
    processTimeouts ( );
    if (timeoutQueueEmpty( ))
    {
        wait = FOREVER;
    }
  }
}
```

According to the exemplary embodiments, timeouts may be used to adjust the decision variable 142 so as to "undo" the effects of the P( ) operation that enqueued an object. The processing of the timeout may be performed at both the iso-locator 110 and on the client thread. For instance, the iso-locator 100 may include tick processing that may be atomic with respect to the iso-location operation. When the iso-locator 110 performs tick processing, every thread in the pend queue 144 that has an expired timeout may be released. The iso-locator 110 may maintain a timeout queue for this purpose. The iso-locator 110 may indicate to the resumed thread that the thread was timed out. Furthermore, the iso-locator 110 may not modify the decision variable 142.

For processing the timeout on the client thread, the timed out thread may create a disparity in the count. Specifically, the count may no longer represent the volume at the pend queue 144 added to the in-flight pends less the in-flight releases. In other words, the pend queue count may be off. This disparity may be overcome by maintaining another count concurrently with the semaphore count. Specifically, this semaphore count may be the number of pend message sent less the number of releases processed by the semaphore 140.

Accordingly, if the number of in-flight releases is greater than the number of threads pended or in-flight pended, then the timed out thread would have been released by an in-flight release and should have it status changed to acquired. Otherwise, the thread may be timed out if a successful compare-and-swap ("CAS") is achieved between the decision variable 142 and an incremented in-flight pending count ("scount") and a decremented in-flight release count ("rcount"). If the CAS fails, the process may restart.

Figure 2:
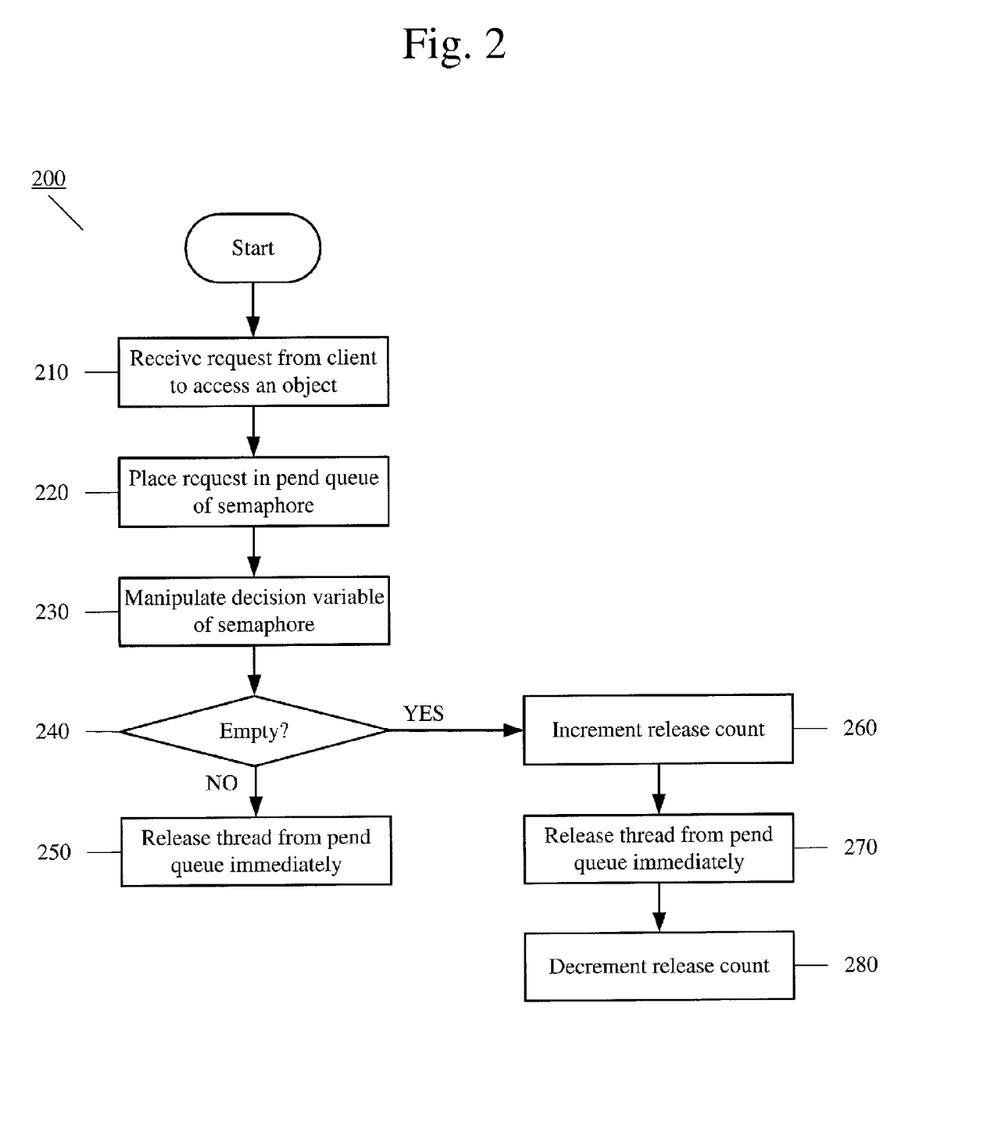
FIG. 2 shows an exemplary method utilizing a semaphore with timeout and lock-free path for message passing architectures according to an exemplary embodiment.

FIG. 2 shows an exemplary method 200 utilizing a semaphore with timeout and lock-free path for message passing architectures according to an exemplary embodiment.

In step 210, the method 200 may receive a request from a client 120 to access an object, the object including a plurality of resources. In step 220, the method 200 may place the request in a lock-free pend queue 144 of a semaphore 140.

In step 230, the method 200 may manipulate a count (e.g., decision variable 142) of the semaphore 140 based on an availability of at least one of the plurality of resources. As noted above, the decision variable 142 may be manipulated based on P( ) and V( ) operations, wherein P( ) operations relate to decisions on pending a thread and V( ) operations relate to decisions on releasing a thread.

In step 240, the method 200 may determine whether the pend queue 142 is empty. If the pend queue 142 is not empty, the method 200 may advance to step 250, wherein the method 200 immediately releases the thread from the lock-free pend queue 142 upon receiving a pend message.

If the pend queue is empty, the method 200 may advance to step 260, wherein the method 200 increments the release count representing the number of thread to release immediately upon receiving a pend message. In step 270, the method 200 may receive a pend message for a thread. In step 280, the method 200 may immediately release a thread upon receiving a pend message and decrement the release count upon release.

Figure 3:
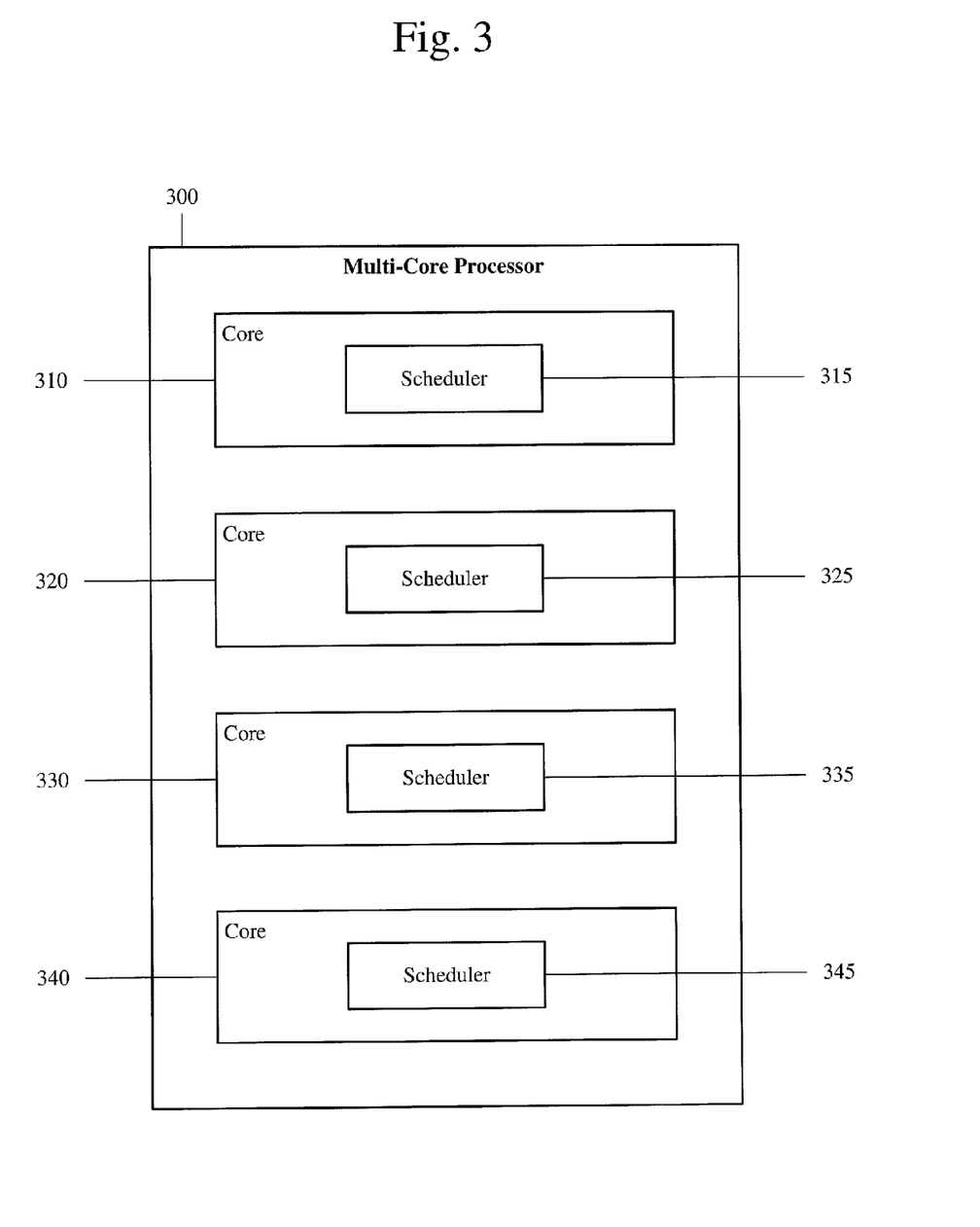
FIG. 3 shows an exemplary multi-core processor according to an exemplary embodiment.

FIG. 3 shows an exemplary multi-core processor 300 according to an exemplary embodiment. The multi-core processor 300 may be configured to utilize a semaphore to schedule tasks to be performed. A semaphore may be for an individual core of the multi-core processor 300. The multi-core processor 300 may include cores 310, 320, 330, 340 and each core may include a scheduler 315, 325, 335, 345, respectively.

It should be noted that the multi-core processor 300 may be a conventional processor utilizing more than one core in which the more than one core is integrated into a single integrated circuit die or integrated in a single chip package. However, it should also be noted that the multi-core processor 300 may also represent any processor system that utilizes more than one core. For example, the multi-core processor 300 may represent more than one uniprocessors that are utilized as a processor system for executing processes. In another example, the multi-core processor 300 may represent a conventional multi-core processor and at least one uniprocessor to comprise the processor system. Those skilled in the art will understand that the exemplary embodiments may relate to any processing system such as those described above.

The cores 310, 320, 330, 340 may be processing units that comprise the multi-core processor 300. According to the exemplary embodiments, a software program may be run exclusively on one of the cores 310, 320, 330, 340. That is, the software program may be executed by only one of the cores 310, 320, 330, 340. However, it should be noted that each of the cores 310, 320, 330, 340 may be responsible for multiple software programs and, therefore, the number of software programs is not limited by the number of cores.

Each of the cores 310, 320, 330, 340 may include a respective scheduler 315, 325, 335, 345 that may serve as a managing unit for each semaphore. That is, the schedulers 315, 325, 335, 345 may manage the software running on the cores, in particular for scheduling threads on the respective core.

According to the exemplary embodiments, the management of the semaphores for the multi-core processor 300 may be performed without a need for locks or non-deterministic atomic operations. Specifically, the management of the semaphores relies on an ability to send short messages between software objects running on different cores without the use of spinlocks or atomic operators. The semaphores used in the exemplary embodiments may function in a substantially similar manner as those used in conventional systems. For example, the count for the semaphore may be represented as an integer.

According to the exemplary embodiments, the acquiring operation of a semaphore may be performed without the use of locks. Initially, a variable representing a semaphore's count may be atomically decremented when attempting to acquire the semaphore. The semaphore's count may represent a set of available resources in which the semaphore may task operations. Thus, if the result after the decrementing is greater than −1, then the scheduler of the core may consider the semaphore to be successfully acquired by the task to be performed. When an operation is to be queued on the semaphore, those skilled in the art will understand that any communication means may be used such as the software sending a signal to the multi-core processor 300 that forwards the signal to a respective core.

If the result after the decrementing is less than or equal to −1, then the acquiring operation may first save a currently executing thread's context (since all resources are in use). That is, a list of the pending operations to be performed by the core that is scheduled by the semaphore is stored. The acquiring operation may then switch to a "scheduler stack" which is local to the scheduling software on the current core. The signal or message sent by the multi-core processor 300 to the respective core may be received by the respective scheduler of the core that is interpreted as a request that the current thread be added to its list of threads pending for the semaphore. The operation may be saved to the list upon receiving the request. It should be noted that if the core is the manager of the semaphore, then the manager side may execute the acquiring operation by a function call in contrast to using a signal/message. Subsequently, the scheduler of the core may execute a scheduling decision regarding running a next available thread of the semaphore.

The above describes a general acquiring operation for a new operation according to the exemplary embodiments. The acquiring operation performed by the scheduler or the manager of the semaphore may also include further steps. The scheduler may initially lock interrupts to prevent a new operation from preempting pending operations already listed on the semaphore. The scheduler may then check a "release count" of the pending queue. When the check is greater than 0, then the scheduler may decrement the release count. Thus, the thread is not added to the pending queue and the acquiring operation is run using conventional means. When the check is equal to 0, then the thread identification of the new operation may be added to the pending queue as described above. The scheduler may use appropriate ordering algorithms to determine where the thread identification fits in the pending queue. For example, a high priority operation may take precedence on the pending queue. When the thread identification is added to the semaphore in either scenario, the scheduler may unlock the interrupts and continue operation.

According to the exemplary embodiments, the releasing operation for a semaphore may be performed without the use of non-deterministic atomic operators. Initially, the general release operation may include atomically incrementing the variable representing the semaphore's count. Thus, for the general release operation, if the result of the incrementing is greater than 0, then the release successfully occurred as the semaphore count indicates that the semaphore may readily accept at least one more operation on the calling thread. If the result of the incrementing is less than or equal to zero, a "release" message may be sent to the scheduler of the core. It should be noted that according to this exemplary embodiment, the releasing operation may only be implemented without the use of non-deterministic atomic operators in which atomically incrementing and decrementing are deterministic operations.

It may be noted that there is nothing to preclude the use of non-deterministic atomic operators to implement the exemplary systems and methods described herein. Accordingly, both synchronous and asynchronous messaging systems may be implemented for architectures that supply either deterministic or non-deterministic atomic operators.

The above describes a general releasing operation for a semaphore according to the exemplary embodiments. The releasing operation performed by the scheduler or the manager of the semaphore may also include further steps. Initially, the manager may lock interrupts. The manager may then check whether the pending queue discussed above relating to the addition of a new operation to the semaphore count when the count is less than zero is empty. If the pending queue is empty, the manager may increment the "release count". If the pending queue is not empty, the manager may remove a head item of the pending queue (e.g., a first item on the list). The manager may then unlock the interrupts and schedule the unpended thread.

Figure 4:
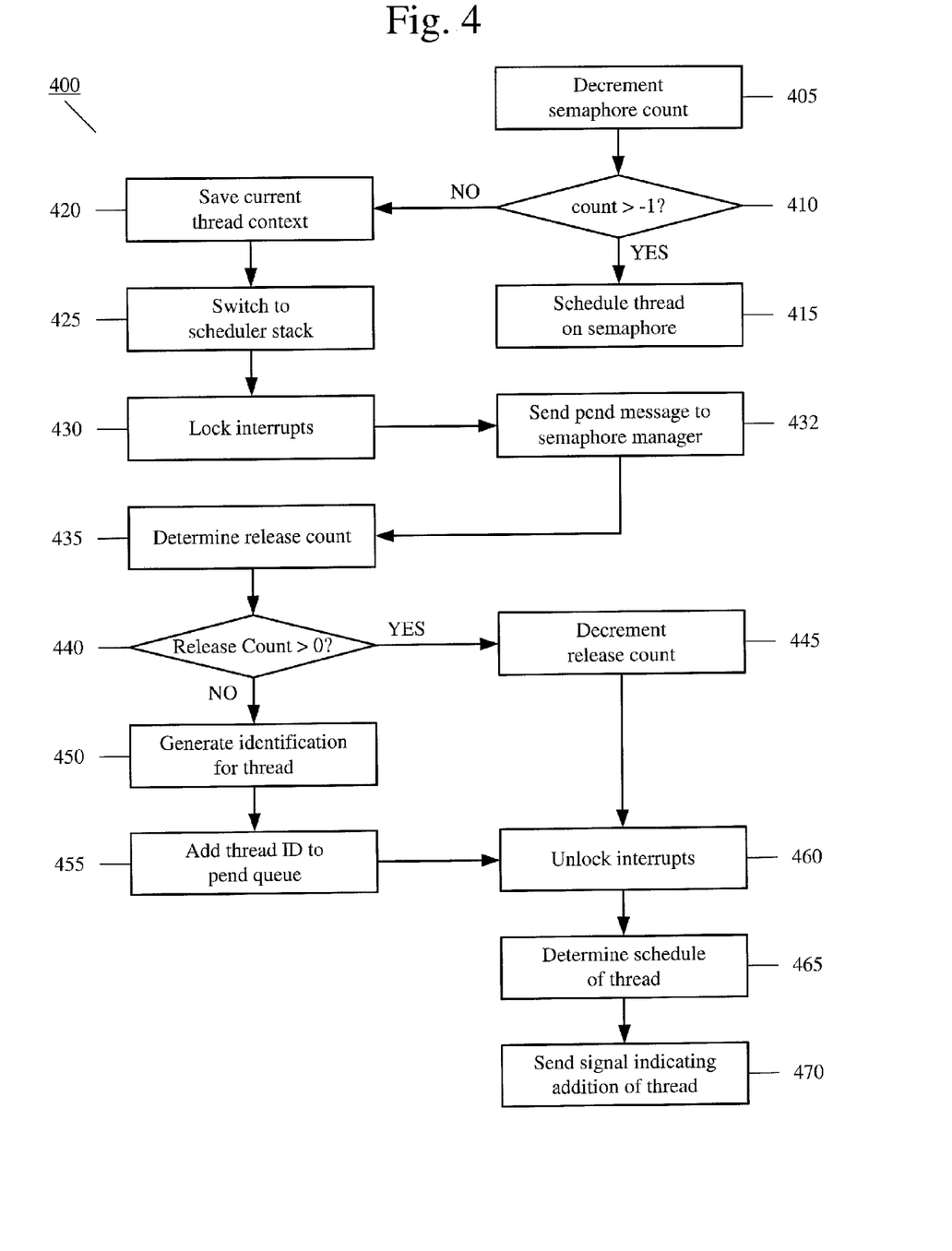
FIG. 4 shows a method for acquiring a semaphore according to an exemplary embodiment.

FIG. 4 shows a method 400 for acquiring a semaphore according to an exemplary embodiment. As discussed above, the acquisition of a semaphore may be performed without the use of locking the semaphore. The method 400 will be described with reference to a thread being added to a queue of a semaphore for one of the cores 310, 320, 330, 340 via the respective scheduler 315, 325, 335, 345 of FIG. 3.

In step 405, a new thread is attempting to be acquired by a semaphore designated for executing the thread. Thus, the selected semaphore decrements the count as commonly performed when acquiring the semaphore. In step 410, a determination is made whether the semaphore count is greater than −1. If the semaphore count is greater than −1, the method 400 continues to step 415 where the new thread is scheduled on the semaphore.

If the semaphore count is less than or equal to −1, the method 400 continues to step 420. In step 420, the current thread context is saved. As discussed above, the pending queue including a list of threads to be executed on the semaphore is saved.

In step 425, the semaphore switches to a scheduler stack to include the new thread despite the semaphore count being less than or equal to −1. As discussed above, the scheduler stack may be local to the scheduling software on the selected core.

In step 430, the scheduler of the core locks interrupts. In step 432, a pend message is sent to the semaphore manager. Specifically, as will be described in further detail below, steps 435-460 are performed on the semaphore manager. In step 435, the release count of the pending queue (i.e., a further count related to the semaphore) is determined. In step 440, if the release count is greater than or equal to zero, the method 400 continues to step 445 where the release count is decremented. Substantially similar to the semaphore count, the release count may relate to a threshold in which further threads may be added to the pending queue. It may be noted that an exemplary release count may strictly be greater than 0 in step 440.

If the release count is equal to zero, the method continues to step 450 where an identification is generated for the new thread. In step 455, the thread identification is added to the pending queue. Thus, the scheduler stack further includes the new thread being represented as the thread identification. It should be noted that the use of the scheduler stack is only exemplary. Thus, the method 400 may not include a switch to the scheduler stack but the method 400 may still be implemented.

In step 460, the interrupts are unlocked. In step 465, the scheduler determines a scheduling for the new thread in relation to the context thread (e.g., list of pending threads on the semaphore). Thus, if the new thread has a high priority, the new thread may be shifted to a position in which a more immediate execution of the thread may be performed. In a first example, the new thread may be placed among the pended threads of the pending queue. If the new thread has a low priority, the new thread may be placed at the bottom of the pending queue. If the new thread has a high priority, the new thread may be placed over other pended threads of the pending queue, thereby shifting all lower priority pended threads behind the new thread. In a second example, the new thread may further be placed among the pending threads of the semaphore. For example, the new thread may be an extremely high priority item that requires immediate attention. In such a case, the new thread may bypass the pending queue and be placed among the pending threads of the semaphore already scheduled. In such an embodiment, a lowest priority item of the pending threads may be shifted into the pending queue as an unpended thread. In step 470, the processor may send a signal to the semaphore indicating the addition of the thread. It should be noted that steps 465 and 470 are performed on the original core.

Figure 5:
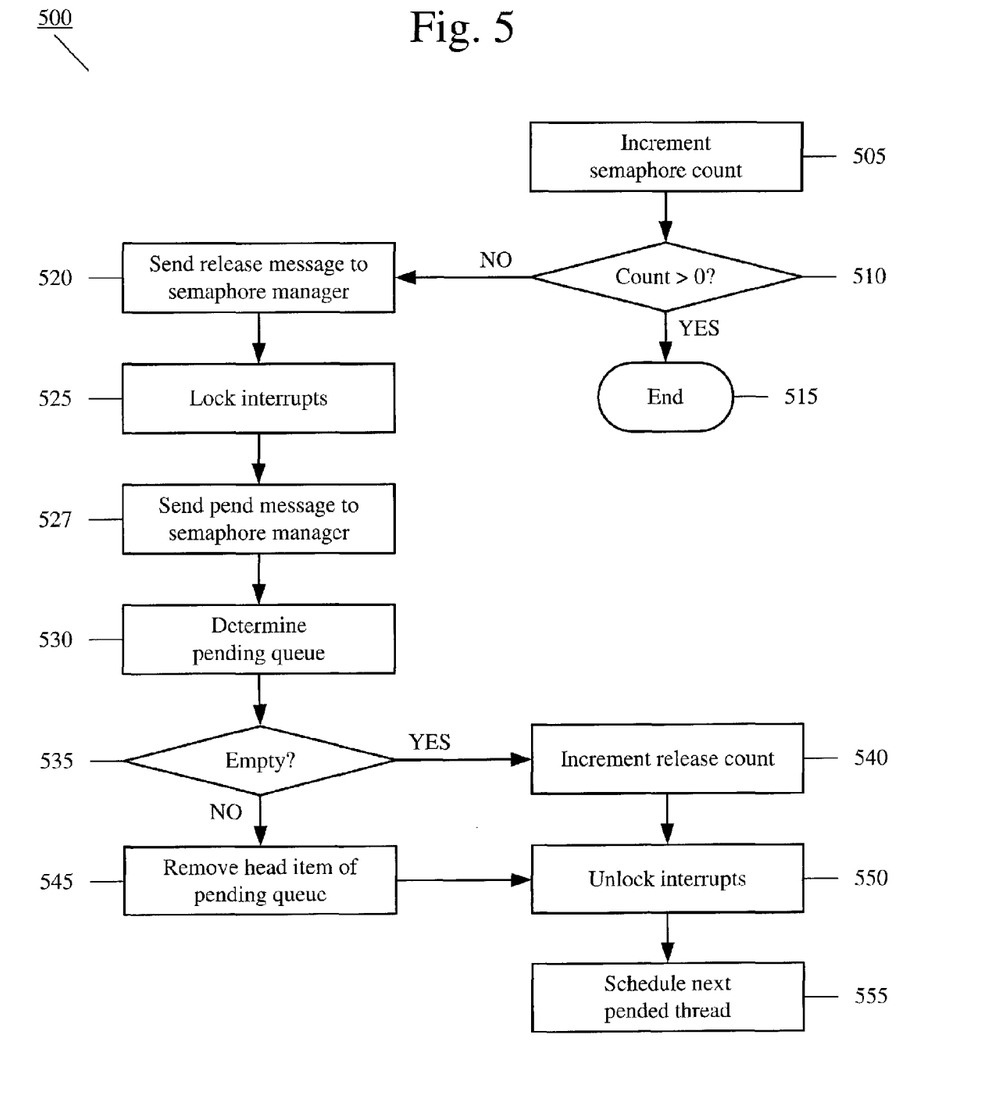
FIG. 5 shows a method for releasing a semaphore according to an exemplary embodiment.

FIG. 5 shows a method 500 for releasing a semaphore according to an exemplary embodiment. As discussed above, the releasing of a semaphore may be performed without using non-deterministic atomic operators. It should be noted that hardware that does not have a deterministic increment/decrement functionality may still utilize non-deterministic atomic operators. The method 400 will be described with reference to a thread no longer requires resources and freeing a semaphore for one of the cores 310, 320, 330, 340 via the respective scheduler 315, 325, 335, 345 of FIG. 3.

In step 505, a scheduled thread no longer requires resources and thus, the designated semaphore for the executed thread increments the count as commonly performed when releasing the semaphore. In step 510, a determination is made whether the semaphore count is greater than zero. If the semaphore count is greater than or equal to zero, the method 500 ends at step 515.

If the semaphore count is less than or equal to zero, the method 500 continues to step 520. In step 520, the processor sends a release message to the manager of the semaphore. This message may indicate that the semaphore remains to have a negative semaphore count that further indicates the pending queue. Thus, in step 525, the manager locks interrupts. In step 527, a pend message is sent to the semaphore manager. Specifically, as will be described in further detail below, steps 525-550 are performed on the semaphore manager. It may be noted that step 527 may occur in a context other than the semaphore manager (e.g., outside the manager). While an exemplary embodiment may be for an asynchronous messaging system implementation, the step 527 may execute in the context of the thread that released the semaphore or in another thread.

In step 530, the pending queue of the semaphore is determined. In step 535, if the pending queue is empty, the method 500 continues to step 540 where the release count of the pending queue is incremented. If the pending queue is not empty, the method 500 continues to step 545 where the head item of the pending queue is removed. In step 550, the manager unlocks the interrupts. In step 555, the next pended thread of the pending queue is scheduled. It should be noted that step 555 may be performed on the original core (e.g., calling core).

Figure 6:
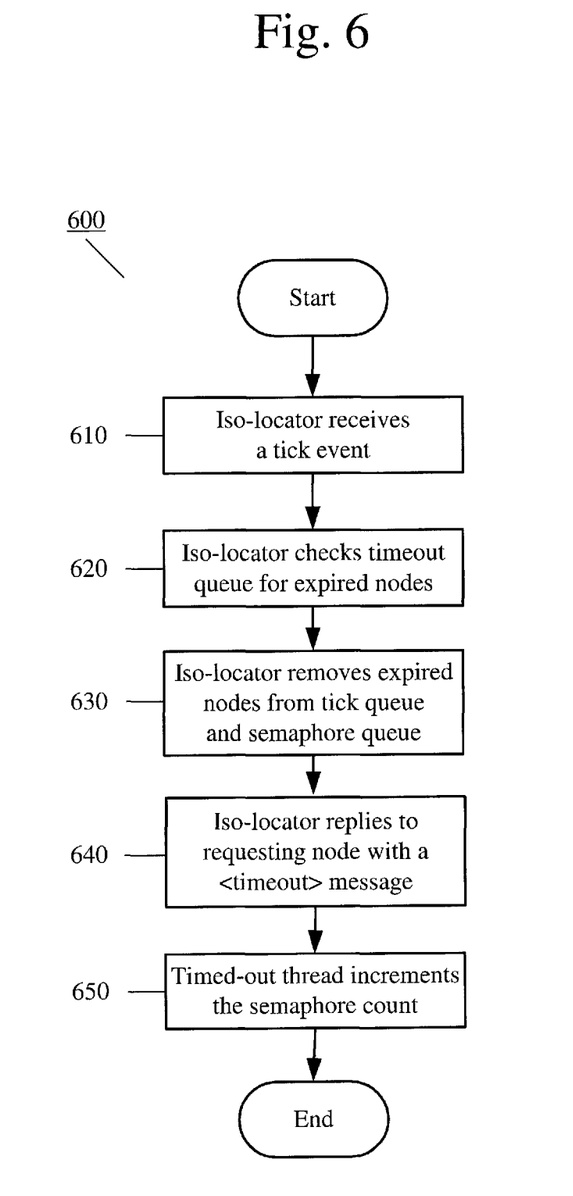
FIG. 6 shows a method for sending a timeout message to a node according to an exemplary embodiment.

FIG. 6 shows a method 600 for sending a timeout message to a node according to an exemplary embodiment. The exemplary method 600 will be described in reference to system 100 of FIG. 1. In step 610, the exemplary iso-locator 110 may receive a tick event from a node (e.g., client 120) via the request 130. In step 620, the iso-locator 110 may check the timeout queue 116 for expired nodes. In step 630, the iso-locator 110 may remove the expired nodes from the tick queue (e.g., timeout queue 116) and the semaphore queue (e.g., pend queue 144). In step 640, the iso-locator may reply to that node with a <timeout> message. In the context of the thread that has timed out, in step 650, the timed-out thread may increment the semaphore count that had previously been decremented on the P operation resulting in the thread pending on the semaphore 140.

The exemplary embodiments may incorporate further measures that utilize the completely lock-free aspect for providing improved validation and deletion safety when performing concurrent acquisition/release of a semaphore. Specifically, the operation includes management of an object table data structure. The data structure may be a table with rows representing objects or semaphores that may be allocated or free. Objects may be referred to by index in the table (e.g., row number) and a generation number that refers to the number of times that the row has been allocated.

In standard terminology, an exemplary semaphore uses the P operation or decrementing the semaphore count while the release of a semaphore is accomplished using the V operation or incrementing the semaphore count. According to the exemplary embodiments, validation of the identification may be performed by matching a generation number of the row with the generation number of the identification. Deletion safety may be implemented using a Boolean flag that indicates that a row is to be deleted. To accomplish the above, the methodology may set several rules for operating these values.

In a first rule, the generation number may be incremented on deletion of an object. In a second rule, once a deletion flag is set, the P operation will always fail with an error (object deleted). In a third rule, deletion may not actually be done until the semaphore count is non-negative. To appropriately set the values, a single atomic variable may be used which may be manipulated with a Compare and Swap or a Load-Linked/Store-Conditional routine.

Therefore, according to the exemplary embodiments, the rules for operating a semaphore may be established. For an exemplary a semaphore, a first rule may be when the count is positive (before acquisition) and the delete flag is not set. Then the count is decremented and the acquisition is complete. In a second rule for an exemplary semaphore, if the count is zero or negative (before acquisition) and the delete flag is not set, the acquiring thread must pend. For a release of a semaphore, a first exemplary rule may be when the count is less than −1 (before release). Then one waiter is unpended and the semaphore continues. In a second rule for a release, the generation number may be incremented and the delete flag cleared when the result of incrementing the semaphore count is zero or greater. Using these rules for operating the values and operating the semaphore, the operations may be performed on all three fields simultaneously with an appropriate atomic operator to provide good validation and complete deletion safety without the use of locks.

The above described exemplary embodiments provide message passing architectures using of a semaphore timeout in multi-core processors that do not require the use of conventional locks and/or non-deterministic atomic operators. Specifically, the functionality of the semaphore (e.g., timeout) may be performed without the use of locks while the release of the semaphore may be performed without the use of atomic operators. It should be noted that this operation may utilize either Compare-and-Swap or Load-Linked/Store-Confidential which are non-deterministic atomic operators. It should also be noted that this operation may not be limited to non-deterministic atomic operators, and may be implemented with either deterministic or non-deterministic operators.

Those skilled in the art will understand that the above described exemplary embodiments may be implemented in any number of manners, including, as a separate software module, as a combination of hardware and software, etc. For example, the semaphore operations may be a program containing lines of code that, when compiled, may be executed on the processor 300.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   receiving a request from a client to access an object, the object including a plurality of resources;
   placing the request in a lock-free pend queue of a semaphore, the lock-free pend queue excluding a locking operation on the semaphore that prevents the semaphore from being isolated;
   manipulating a decision variable based on an availability of at least one of the plurality of resources;
   determining whether the client can use a fast path to the object by atomically manipulating the decision variable, wherein the fast path is an operation that utilizes a lock-free path to the object; and
   tracking elapsed time to manage semaphore timeouts, wherein at least one of the semaphore timeouts is used to adjust the decision variable.

2. The method of claim 1, further comprising:
   releasing a thread from the lock-free pend queue upon receiving a pend message.

3. The method of claim 1, wherein the decision variable includes a release count and an in-flight release count.

4. The method of claim 3, further comprising:
   incrementing the release count when the lock-free pend queue is empty;
   releasing a thread immediately upon receiving a pend message; and
   decrementing the release count upon release.

5. The method of claim 1, further comprising:
   releasing a thread having an expired timeout.

6. The method of claim 1, wherein lock-free pend queue is a data structure capable of maintaining a specified order scheme of blocked clients on the semaphore.

7. The method of claim 1, wherein the decision variable is an atomically modifiable variable visible in memory to all entities that make use of the semaphore.

8. The method of claim 1, wherein the fast path is free of messaging and blocking.

9. A system, comprising:
   an object including a plurality of resources;
   a semaphore including a lock-free pend queue and a decision variable; and
   an iso-locator core receiving a request from a client to access the object, placing the request in the lock-free pend queue of the semaphore, manipulating the decision variable of the semaphore based on an availability of at least one of the plurality of resources, and determining whether the client can use a fast path to the object by atomically manipulating the decision variable,
   wherein the fast path is an operation that uses a lock-free path to the object,
   wherein the lock-free pend queue excludes a locking operation on the semaphore that prevents the semaphore from being isolated,
   wherein the iso-locator core further tracks elapsed time to manage semaphore timeouts, and wherein at least one of the semaphore timeouts is used to adjust the decision variable.

10. The system of claim 9, wherein the iso-locator core further releases a thread from the lock-free pend queue upon receive a pend message.

11. The system of claim 9, wherein the decision variable includes a release count and an in-flight release count.

12. The system of claim 11, wherein the iso-locator core further increments the release count when the lock-free pend queue is empty, releases a thread immediately upon receiving a pend message, and decrements the release count upon release.

13. The system of claim 9, wherein the iso-locator core further releases a thread having an expired timeout.

14. The system of claim 9, wherein lock-free pend queue is a data structure capable of maintaining a specified order scheme of blocked clients on the semaphore.

15. The system of claim 9, wherein the decision variable is an atomically modifiable variable visible in memory to all entities that make use of the semaphore.

16. The system of claim 9, wherein the fast path is free of messaging and blocking.

17. A computer readable storage medium including a set of instructions executable by a processor, the set of instructions operable to:
   receive a request from a client to access an object, the object including a plurality of resources;
   place the request in a lock-free pend queue of a semaphore, the lock-free pend queue excluding a locking operation on the semaphore that prevents the semaphore from being isolated;
   manipulate a decision variable based on an availability of at least one of the plurality of resources;
   determine whether the client can use a fast path to the object by atomically manipulating the decision variable, wherein the fast path is an operation that utilizes a lock-free path to the object; and
   track elapsed time to manage semaphore timeouts, wherein at least one of the semaphore timeouts is used to adjust the decision variable.

18. The computer readable storage medium of claim 17, wherein the decision variable includes a release count, and wherein the instructions are further operable to:
   increment the release count when the lock-free pend queue is empty;
   release a thread immediately upon receiving a pend message; and
   decrement the release count upon release.

19. The computer readable storage medium of claim 17, wherein lock-free pend queue is a data structure capable of maintaining a specified order scheme of blocked clients on the semaphore.

20. The method of claim 1, wherein the decision variable is a count that includes a first range and a second range, wherein the first range of the count indicates free resources that and the second range of the count indicates a number of waiting clients.

* * * * *

UNITED STATES PATENT AND TRADEMARK OFFICE
CERTIFICATE OF CORRECTION

PATENT NO. : 9,772,888 B2  
APPLICATION NO. : 13/859852  
DATED : September 26, 2017  
INVENTOR(S) : Richardson et al.

Page 1 of 1

It is certified that error appears in the above-identified patent and that said Letters Patent is hereby corrected as shown below:

In the Claims

Claim 10, Column 14, Line 16:
"receive a pend message" should read "received a pend message"

Claim 20, Column 15, Line 69:
"that and the second range of the count indicates a number of waiting clients" should read
"and the second range of the count indicates a number of waiting clients"

Signed and Sealed this
Twenty-fourth Day of April, 2018

Andrei Iancu
*Director of the United States Patent and Trademark Office*